United States Patent
Sayeed et al.

(10) Patent No.: US 6,728,202 B1
(45) Date of Patent: Apr. 27, 2004

(54) CODE DIVISION MULTIPLEX SATELLITE BROADCASTING SYSTEM

(75) Inventors: Zulfiquar Sayeed, East Windsor, NJ (US); Vijitha Weerackody, Watchung, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/220,722

(22) Filed: Dec. 24, 1998

(51) Int. Cl.[7] .................... H04J 11/00; H04B 7/185; H04B 7/216
(52) U.S. Cl. .................... 370/208; 370/316; 370/335
(58) Field of Search ................. 370/208, 315, 370/320, 316, 390, 342, 492, 519, 335; 375/211, 130, 147, 324, 331, 347, 349; 708/252; 455/7, 18, 13.1, 12.1; 725/63, 48, 67, 68

(56) References Cited

U.S. PATENT DOCUMENTS

| | | | |
|---|---|---|---|
| 5,278,863 A | | 1/1994 | Briskman |
| 5,319,673 A | | 6/1994 | Briskman |
| 5,485,485 A | | 1/1996 | Briskman et al. |
| 5,592,471 A | | 1/1997 | Briskman |
| 5,748,686 A | * | 5/1998 | Langberg et al. ........... 345/367 |
| 5,757,767 A | * | 5/1998 | Zehavi ....................... 370/208 |
| 5,794,138 A | | 8/1998 | Briskman |
| 6,038,263 A | * | 3/2000 | Kotzin et al. ............... 375/299 |
| 6,175,587 B1 | * | 1/2001 | Madhow et al. ............ 375/148 |
| 6,272,168 B1 | * | 8/2001 | Lomp et al. ................ 375/206 |

OTHER PUBLICATIONS

R. D. Briskman, "Satellite DAB," *International Journal of Satellite Communications,* vol. 13, pp. 259–266, 1995.

E. Dahlman et al.,, "UMTS/IMT–2000: Based on Wideband CDMA," *IEEE Communications Magazine,* vol. 36, pp. 70–81, Sep. 1998.

J. Herre et al., "The Integrated Filterbank Based Scalable MPEG–4 Audio Coder," *105th AES Convention,* San Francisco, CA, Sep. 1998.

Chin–Lin I. and R. D. Gitlin, "Multi–Code CDMA Wireless Personal Communications Networks," *Proc. of ICC '95,* Seattle, Washington, pp. 1060–1064, Jun. 1995.

W.C. Jakes, *Microwave Mobile Communications,* 13–16, (John Wiley & Sons, 1974).

(List continued on next page.)

*Primary Examiner*—Duc Ho
(74) *Attorney, Agent, or Firm*—Ryan, Mason & Lewis, LLP

(57) ABSTRACT

A CDM satellite transmission system that broadcasts programming content, such as audio or video information, using two geo-synchronous satellites and a plurality of terrestrial repeaters based on Code division multiple access [(CDMA)] technology is disclosed. A plurality of programming channels is multiplexed onto a carrier frequency using Code division multiple access [(CDMA)] technology. A delayed version of the signal is transmitted with the on-time version of the programming content to accommodate uninterrupted reception in the event of a blockage. The on-time and delayed version of each information channel is transmitted by each of the satellites and repeaters, providing additional diversity gains. Thus, the satellites and terrestrial repeaters occupy the entire available bandwidth. CDM transmissions are used where the pseudo-noise sequences are the same, or linear translates of one another. The terrestrial repeaters have a direct line of sight to at least one satellite and repeat the transmission of only one satellite.

30 Claims, 5 Drawing Sheets

OTHER PUBLICATIONS

M. Kavehrad and B. Ramamurthi, "Direct–Sequence Spread Spectrum with DPSK Modulation and Diversity for Indoor Wireless Communications," *IEEE Trans. On Communications,* vol. 35, 224–236 (Feb. 1987).

J. S. Lehnert and M.B. Pursley, Multipath Diversity Reception of Spread–Spectrum Multiple–Access Communications, *IEEE Trans. On Communications,* vol. 35, 1189–1198 (Nov. 1987).

E. Lutz et al., "The Land Mobile Satellite Communication Channel–Recording, Statistics, and Channel Model," *IEEE Trans. on Vehicular Technology,* vol. 40, 375–386, (May 1991).

D.K. Sachdev, "The Worldspace System: Architecture, Plans and Technologies," *Conf. Proc. Broadcast Asia 98,* (Singapore), 219–228 (Jun. 1998).

L. Thibault et al., "EIA/NRSC DAR Systems Subjective Tests, Part II: Transmission Impairments," *IEEE Trans. on Broadcasting,* vol. 43, 353–364 (Dec. 1997).

V. Weerackody, "Effect of Time Diversity on the Forward Link of the DS–CDMA Cellular System," *Wireless Personal Communications,* vol. 7, 89–109 (Aug. 1998).

S. G. Wilson, *Digital Modulation and Coding,* 463–65, New Jersey: Prentice Hall, 1996.

\* cited by examiner

CODE DIVISION MULTIPLEX SATELLITE BROADCASTING SYSTEM

FIELD OF THE INVENTION

The present invention relates generally to satellite broadcasting techniques, and more particularly, to satellite broadcasting techniques based on Code Division Multiple Access (CDMA) technology.

BACKGROUND OF THE INVENTION

Satellite broadcasting systems for transmitting programming content have become increasingly popular in many parts of the world. Direct Broadcasting Satellite (DBS) systems transmit television programming content, for example, to a geo-synchronous satellite, which broadcasts the content back to the customers. In such a wireless broadcast environment, the transmitted programming can be received by anyone with an appropriate receiver, such as an antenna or a satellite dish.

In addition, a number of satellite broadcasting systems have been proposed or suggested for broadcasting audio programming content from geo-synchronous satellites to customers in a large coverage area, such as the continental United States. Satellite broadcasting systems for television and radio content provide potentially national coverage areas, and thus improve over conventional terrestrial television stations and AM/FM radio stations that provide only regional coverage.

Code division multiple access (CDMA) techniques have been proposed for satellite broadcasting systems to permit a number of programming channels to be transmitted on the same carrier frequency. Code division multiple access techniques transmit multiple information signals on the same carrier frequency, and differentiate each programming channel by encoding the channel with a unique orthogonal code.

CD Radio Incorporated has proposed a satellite broadcasting system having two satellites and a group of repeaters to provide audio service. The CD Radio system is described, for example, in U.S. Pat. Nos. 5,278,863, 5,319,673, 5,485,485 and 5,592,471. In a developed area, the direct line of sight between a mobile receiver and the transmitters on the satellites and repeaters can be blocked, for example, by underpasses or other structures. Thus, many satellite broadcasting systems transmit a delayed version of each program channel with the on-time version of the program channel to permit uninterrupted reception in the event of a blockage.

In one embodiment of the CD Radio system, for example, each satellite occupies the available bandwidth and each satellite will transmit either the on-time digital audio signal, or a delayed version of the same information for diversity purposes. While the CD Radio system does provide second order diversity, since the same information signal is received from both satellites (ignoring the effects of multi-path propagation), additional diversity gains are desirable. In a fading channel, such as the wireless channels of satellite broadcast systems, diversity has a significant impact on performance. In addition, the receivers in the CD Radio system require a unique pseudo-noise sequence for each satellite and the terrestrial repeaters to differentiate the signals from each source, adding complexity and cost to the receiver design.

SUMMARY OF THE INVENTION

Generally, a CDM satellite transmission system is disclosed that broadcasts programming content, such as audio and video information, using two geo-synchronous satellites and a plurality of terrestrial repeaters based on Code division multiple access technology. A plurality of channels are multiplexed onto a carrier frequency using Code division multiple access technology. The terrestrial repeaters operate in areas where the direct line of sight between the satellites and the mobile receiver can be blocked. Even in the presence of terrestrial repeaters, the direct line of sight between the mobile receiver and the transmitters can be blocked by underpasses or other structures. Thus, the disclosed CDM satellite transmission system transmits a delayed version of the signal with the on-time version of the signal to accommodate uninterrupted reception in the event of such a blockage.

According to one aspect of the invention, the on-time and delayed version of each information channel is transmitted by each of the satellites and repeaters, providing additional diversity gains. Thus, the satellites and terrestrial repeaters occupy the entire available bandwidth. According to another aspect of the invention, CDM transmissions are used where the pseudo-noise sequences are the same, or linear translates of one another (a delayed version to account for propagation delays), to thereby permit a more simplified receiver design.

The link between each repeater and at least one satellite is designed to be line of sight (the repeaters are positioned such that the signal can be received from at least one satellite with no blockage, or the repeater can receive a signal from a terrestrial link). Therefore, the transmissions from both satellites do not need to be repeated. Thus, in one embodiment, the repeater repeats the transmission of only one satellite.

A more complete understanding of the present invention, as well as further features and advantages of the present invention, will be obtained by reference to the following detailed description and drawings.

DETAILED DESCRIPTION

Figure 1:
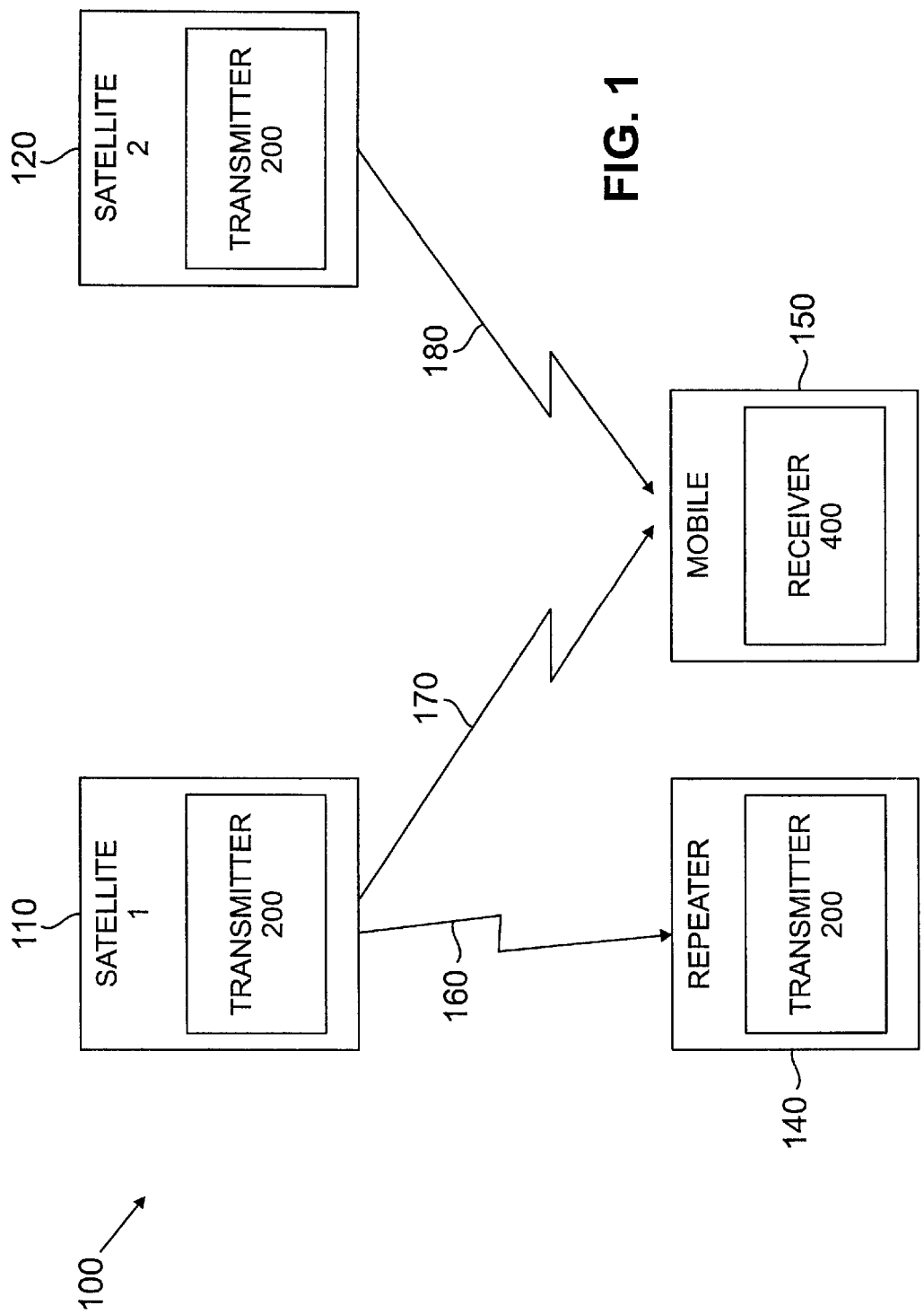
FIG. 1 illustrates a CDM satellite transmission system in accordance with the present invention.

FIG. 1 illustrates a CDM satellite transmission system 100 in accordance with the present invention. The CDM satellite transmission system 100 transmits digital music and other audio information from an uplink station (not shown) to one or more mobile receivers, such as the mobile receiver 150. A plurality of audio channels are multiplexed onto a carrier frequency using Code division multiple access technology. The term Code Division Multiplexing (CDM) is used herein, since the satellite transmission system 100 operates in a broadcast mode. A maximum bit error rate of $10^{-5}$ is generally desirable for compact disk (CD) quality music.

As shown in FIG. 1, the CDM satellite transmission system 100 includes two satellites 110, 120 operating in a broadcast mode. The satellites 110, 120 are designed to be geo-synchronous, and are located over a desired geographical coverage area, such as over the eastern and western United States, at appropriate angles of elevation, as dictated by the requirements of a geo-synchronous system. In addition, the CDM satellite transmission system 100 includes a plurality of terrestrial repeaters, such as the terrestrial repeater 140, discussed below, that will operate in dense urban areas, where the direct line of sight between the satellites 110, 120 and the mobile receiver 150, can be blocked due to the angle of elevation and shadowing by tall buildings.

The direct line of sight between the mobile receiver 150 and one or both satellites 110, 120 and the repeater 140 can be blocked by underpasses or other structures. It has been observed that blockages will generally not last longer than one or two seconds. Thus, the CDM satellite transmission system 100 may transmit a four (4) second delayed version of the signal with the on-time version of the audio output to accommodate uninterrupted reception in the event of such a blockage. When there is no blockage, the receiver only needs to demodulate the on-time signal. To mitigate the loss of signal due to a blockage, however, the receiver must also decode the delayed channel so that the receiver can use the buffered data to supply audio output when a blockage occurs.

According to a feature of the present invention, the on-time and delayed version of each information channel is transmitted by each of the satellites and repeaters, providing additional diversity gains. Thus, the satellites 110, 120 and terrestrial repeaters 140 occupy the entire available bandwidth. In addition, as discussed below in conjunction with FIGS. 2 and 4, CDM transmissions are used where the pseudo-noise sequences are the same, or linear translates of one another (a delayed version to account for propagation delays). Thus, the present invention provides receiver simplicity.

In the illustrative embodiment, the CDM satellite transmission system 100 operates at a carrier frequency of 2.3 Gigahertz. The two satellites 110, 120 transmit the same information using the same frequency band. In one implementation, each satellite carries 36 channels of on-time and delayed signals. Generally, only one or two paths are seen from the mobile receiver 150 to each satellite 110, 120.

The link between each repeater 140 and at least one satellite 110, 120 is designed to be line of sight. In other words, the repeaters 140 are positioned such that the signal can be received from a satellite 110, 120 (or from a terrestrial link) with no blockage. Therefore, repeating the transmissions from both satellites 110, 120 gives no benefit. Thus, as shown in FIG. 1, the repeater 140 repeats only one of the transmissions, such as the signal from satellite 110 in the illustrative embodiment. It is noted that the links 160, 170, 180 between the satellites 110, 120, or repeaters 140 and the mobile receiver 140 are characterized as an L path channel.

The satellites 110, 120 receive the broadcast signal from a studio, over a robust radio frequency (RF) link, and the satellites 110, 120 will broadcast the signal after downconverting the signal to the carrier frequency. The terrestrial repeaters 140 retrieve the information from the satellite, or directly from the studio, by well-known technical means, such as wireline or microwave links. The satellites 110, 120 and the terrestrial repeaters 140 broadcast the signal using the same transmitter 200, discussed below in conjunction with FIG. 2, and multiplexing technology.

Figure 2:
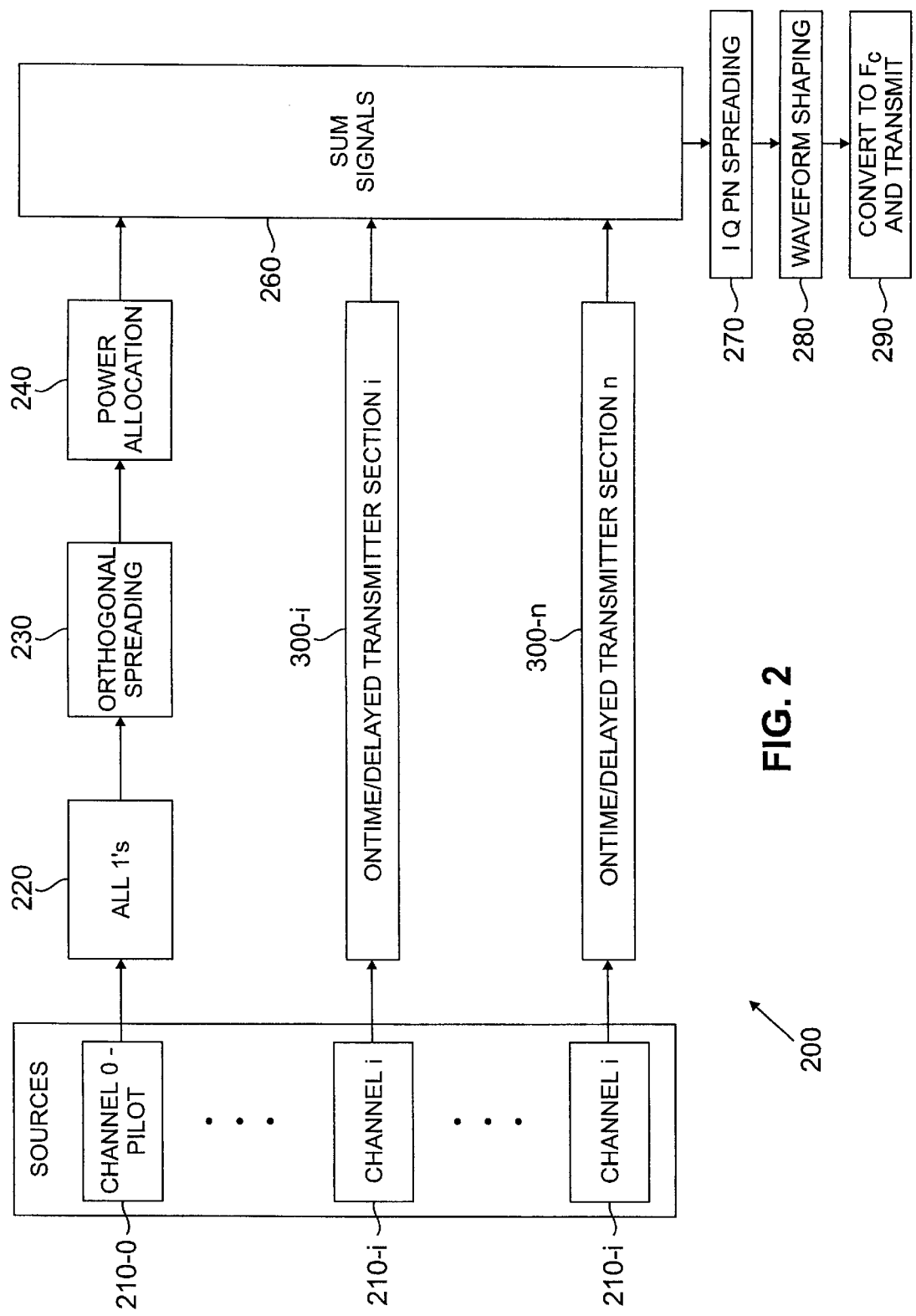
FIG. 2 illustrates the transmitter of FIG. 1.

As shown in FIG. 2, each transmitter 200 includes n+1 sources 210-0 through 210-n for providing n information channels. The zero-th channel is reserved for the pilot signal in the illustrative embodiment. The pilot channel allows a mobile station to acquire the timing of the Forward CDM Channel after a mobile receiver 150 is initially turned on ("initial pilot detection"). In addition, the pilot channel enhances the overall signal quality by providing a phase reference for coherent demodulation ("continuous pilot detection"). The pilot channel is unmodulated, all 1's. and is assigned the orthogonal code "0" which is also the one sequence, in accordance with IS-95.

The pilot signal is encoded with an orthogonal code 230. The length of the orthogonal code 230 may be determined based on the number of one-time and delayed channels to be transmitted. The length of the orthogonal code 230 need not be a power of two. For a detailed description of a spread spectrum system that utilizes orthogonal codes having lengths that are not a power-of 2, see U.S. patent application Ser. No. 09/184,613, filed Nov. 2, 1998, entitled "A Method And Apparatus For Achieving Channel Variability In Spread Spectrum Communication Systems," assigned to the assignee of the present invention and incorporated by reference herein.

Thereafter, the transmitter allocates the available power 240, among the pilot channel and the audio channels. In one embodiment, the pilot channel is assigned ten percent (10%) of the total power transmitted from each satellite 110, 120 or repeater 140, and the ontime and delayed signals for each of the n information channels share the remaining ninety percent (90%) of the total power. Thus, in an implementation with 36 information sources, each transmitted on-time and delayed signal would receive (90/72) percent of the power.

In one embodiment, each information source 210-0 through 210-n is encoded using a perceptual audio coder (PAC), such as those described in U.S. Pat. No. 5,732,189, assigned to the assignee of the present invention and incorporated by reference herein. In one implementation, the audio coders 210-0 through 210-n output digital information at 96 kilo-bits-per-second. Thereafter, each audio channel is processed by a corresponding on-time/delayed transmitter section 300, such as the on-time/delayed transmitter section 300-i, corresponding to the i-th branch of the transmitter 200. The on-time/delayed transmitter section 300 is discussed below in conjunction with FIG. 3.

The spread signal outputs of each on-time/delayed transmitter section 300 are summed by a signal summer 260, before psuedo-noise spreading 270 is performed in quadrature and in-phase (IQ). Waveform shaping is performed at stage 280 using 12.5 MHz of bandwidth in the illustrative embodiment, with appropriate Nyquist rolloff, before the signals are converted to the carrier frequency, $F_C$, and transmitted at stage 290. It is noted that if some of the channels are known to contain only speech, then the human voice activity factor can be utilized to lower the power level of the speech channels, and increase the CDM link capacity.

It is again noted that the signals transmitted by the satellites 110, 120 and repeaters 140 can all be modulated by the same PN sequence. If the same PN code is used in some parts of the United States (substantially exactly in between the two satellites 110, 120), the signals of each satellite will destructively interfere with each other. At this location, the PN offset of the two satellites become the same or within one chip interval. Thus, the rake processing (discussed below) will pick up an inordinate amount of interference from the other satellite. One solution is to design the PN for the satellites such that they have an offset relative to each other, in which case the geographic location where the two codes are in-phase happens to be outside the service area. For example, not in the continental United States.

Figure 3:
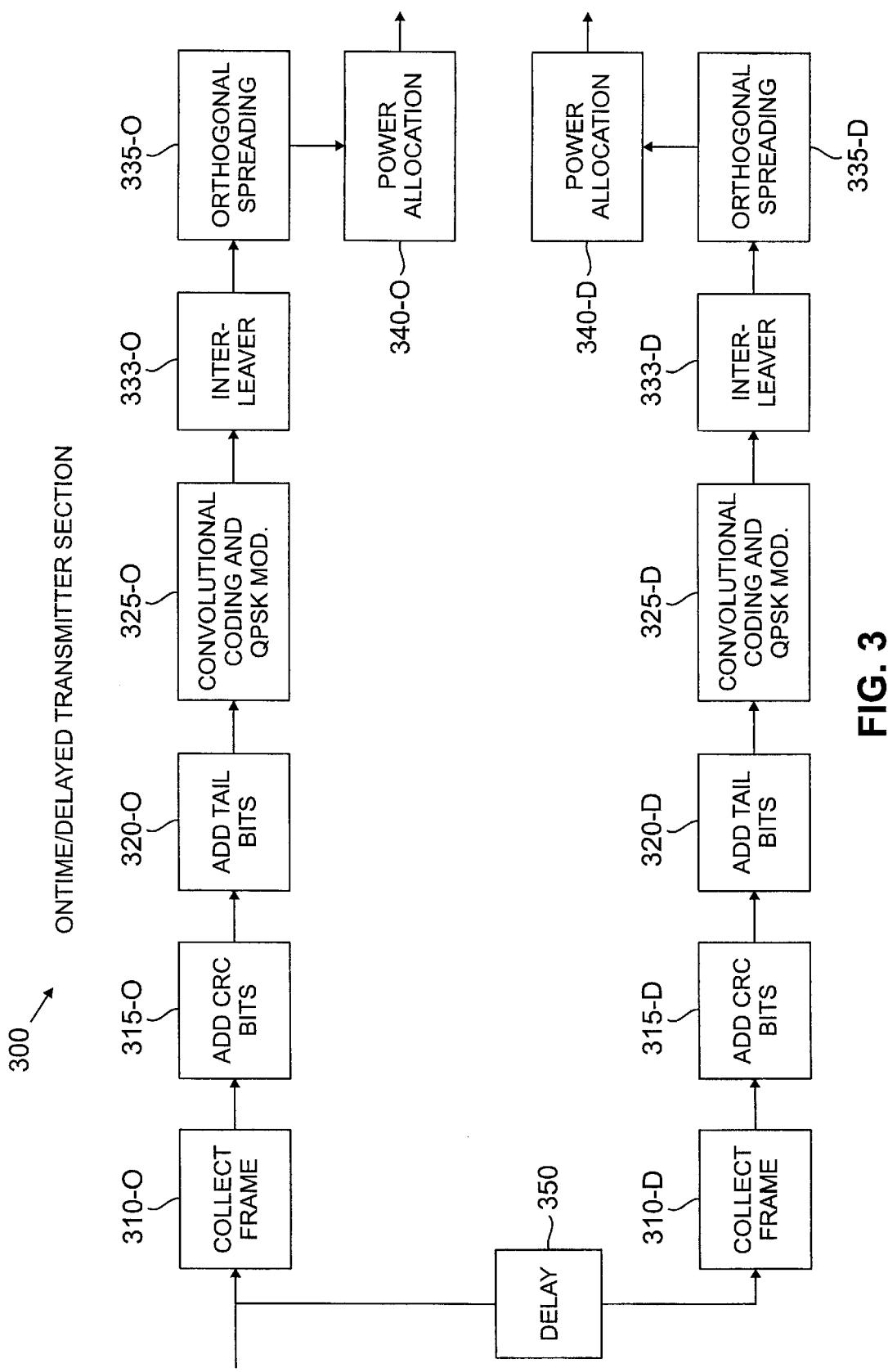
FIG. 3 illustrates an on-time/delayed transmitter section of FIG. 2.

An on-time/delayed transmitter section 300 is shown in FIG. 3. As previously indicated, for the audio channels, both the on-time and delayed versions of the same information are multiplexed by the transmitter 200. Thus, the delayed path (indicated with a "D" in FIG. 3) goes through a four (4) second deep buffer 350 in the illustrative embodiment. The 96 Kbps data is formatted into frames that are 576 bits wide (6 milli-seconds) at stage 310. In this manner, a small modulo number may be used in the frames to differentiate between the two satellite transmissions. The differential delay between the two satellites 110, 120 in the continental United States would be at most 3.4 milli-seconds. Thus, with each frame being six (6) msecs wide, the satellite transmissions may be distinguished. The data is then passed through a cyclic redundancy check (CRC 16) encoder 315 that adds 16 bits, and a tail bit encoder 320 that adds 8 bits to the frame, in accordance with IS-95. Thereafter the 600 bit frame is convolutionally encoded at stage 325 to produce 600 symbols at 100 Ksymbols-per-second, and then interleaved by an interleaver 330 to write the symbols into rows and read them out in columns, in a known manner.

The on-time and delayed audio signals are then encoded with an orthogonal code 335. Again, the length of the orthogonal code 230 need not be a power of two. For a detailed description of a spread spectrum system that utilizes orthogonal codes having lengths that are not a power-of 2, see U.S. patent application Ser. N. 09/184,613, filed Nov. 2, 1998, entitled "A Method And Apparatus For Achieving Channel Variability In Spread Spectrum Communication Systems," assigned to the assignee of the present invention and incorporated by reference herein.

Thereafter, the transmitter allocates the available power among the pilot channel and the audio channels at stage 335. As previously indicated, in the illustrative implementation with 36 information sources, each transmitted on-time and delayed signal would receive (90/72) percent of the power.

Figure 4:
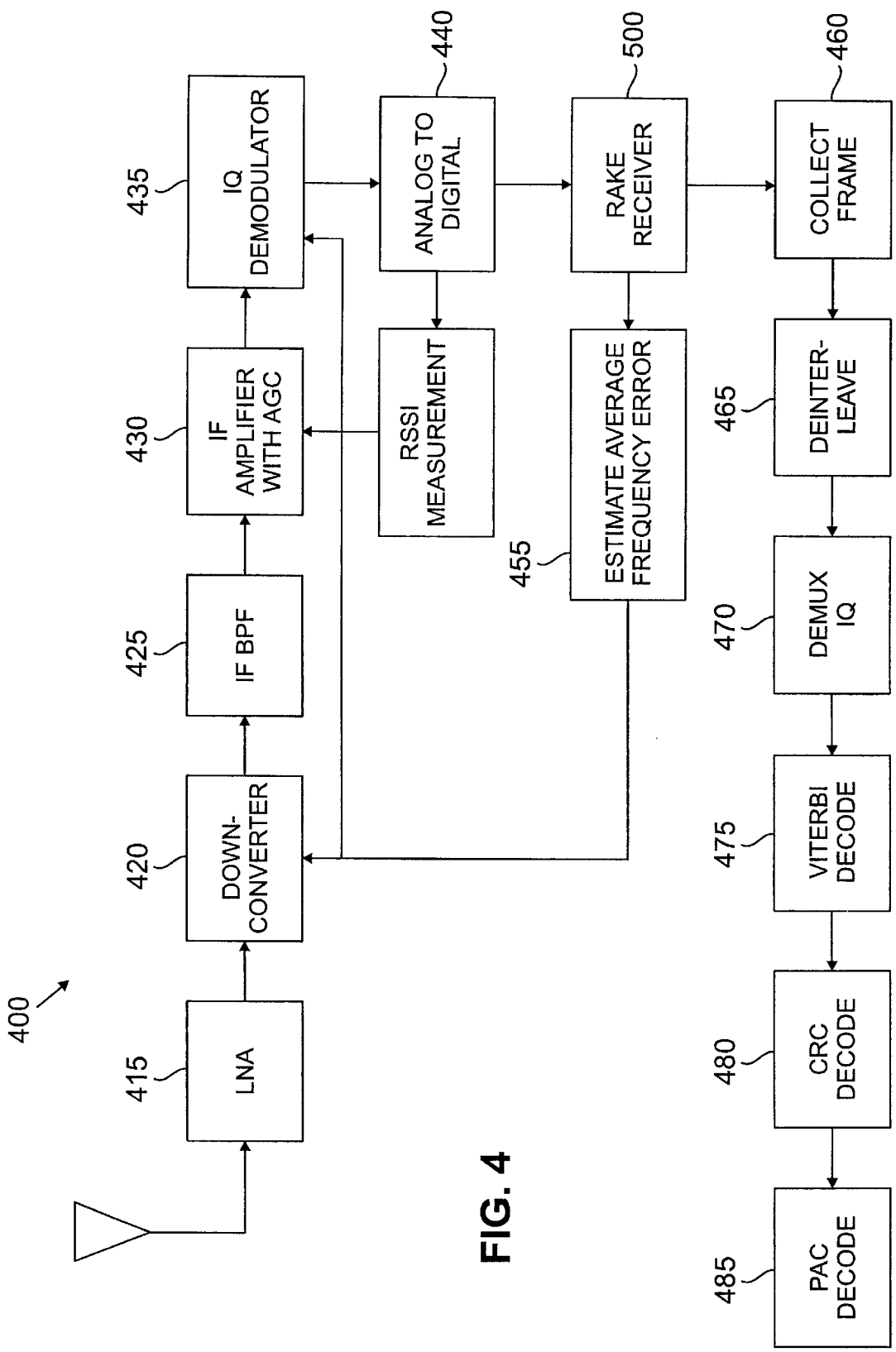
FIG. 4 illustrates the receiver of FIG. 1.

The receiver 400 for the CDM satellite transmission system 100 is shown in FIG. 4. The RF and IF front-end stages 415 through 430 can be comprised of conventional technology, such as those described in Roger L. Freeman, Radio System Design for Telecommunications, Ch. 14 (Wiley & Sons, Inc., 2d. ed., 1997), incorporated by reference herein. The IQ demodulator 435 produces an in-phase and quadrature signal (I/Q) that is applied to an analog-to-digital converter 440. The analog-to-digital converter 440 operates at four (4) times the chip rate. The digital signal produced by the analog-to-digital converter 440 is applied to a received signal strength indicator (RSSI) measurement device 445 that produces a value that is used for automatic gain control in the IF amplifier, in a known manner. In addition, the digital signal produced by the analog-to-digital converter 440 is applied to a rake receiver 500, discussed below in conjunction with FIG. 5. As discussed below, the rake receiver 500 provides a bank of fingers, with each finger having on-time delayed and pilot processing, buffering for the satellites' differential delay, and buffering for on-time/delayed resolution. Thus, the rake receiver 500 includes composite fingers that can track the on-time and delayed versions of the same channel.

The output of the rake receiver 500 is used to estimate the average frequency error at stage 455 from the despread pilot signal. Thereafter, a frequency control adjustment signal is applied to the down converter 420 and IQ demodulator 435, in a known manner. In addition, the 100 Kilo-symbols-per-second output of the rake receiver 500 is collected into the 600 symbol wide 6 msec frames by a framer 460. The frames are then de-interleaved at stage 465, and the in-phase and quadrature signals are demultiplexed at stage 470, to produce 600 bits. A Viterbi decoder 475 then estimates the most likely encoded sequence from the received sequence, before a cyclic redundancy check decoder 480 removes the 16 CRC bits and produces 576 bits at a rate of 96 kilo-bits-per-second. Thereafter, a perceptual audio coder (PAC) 485 decodes the signal to produce the audio information.

Figure 5:
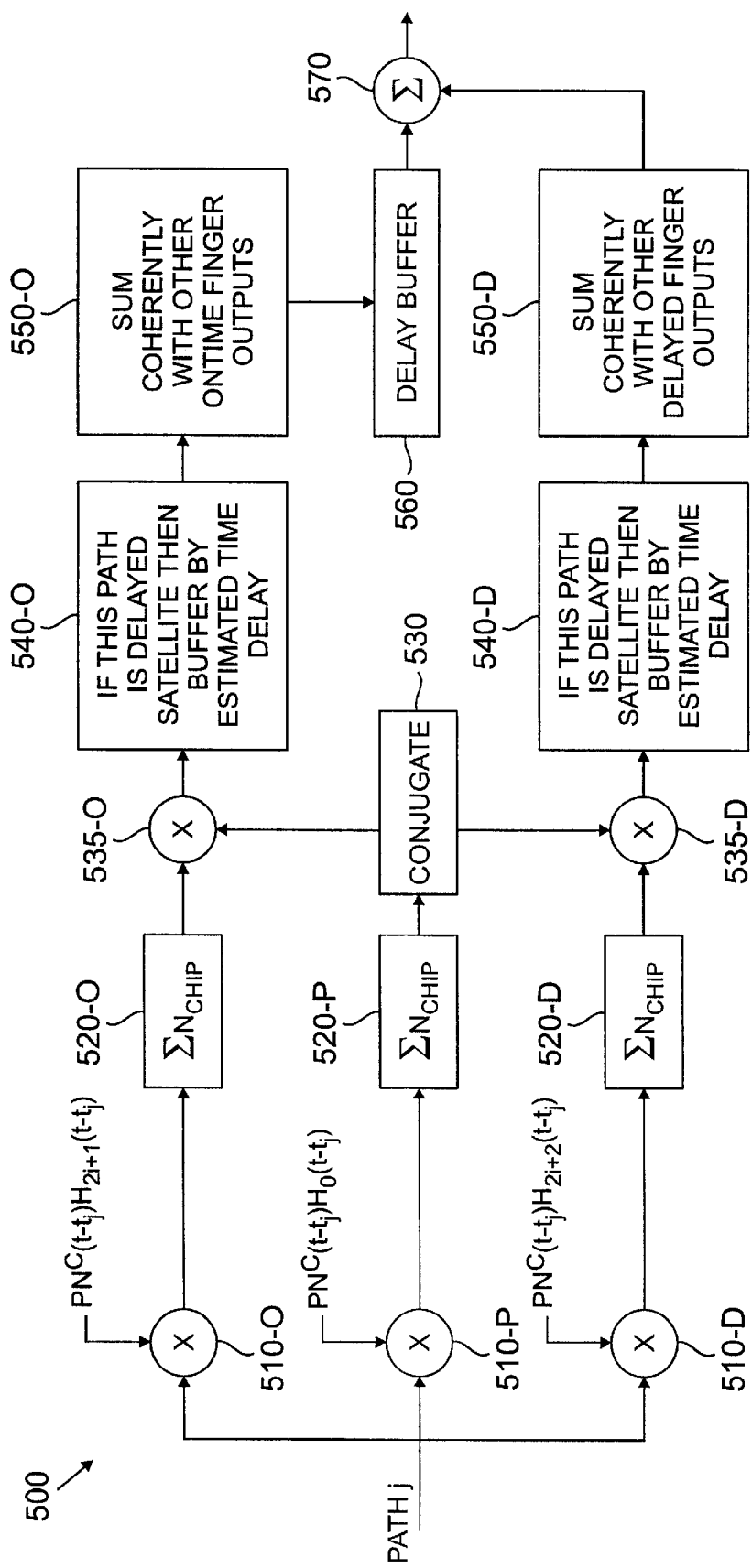
FIG. 5 illustrates the rake receiver of FIG. 4.

One finger of the rake receiver 500 is shown in FIG. 5. The j-th finger shown in FIG. 5 has three (3) branches, namely, a pilot, an on-time and a delayed branch, indicated by "P," "O" and "D," respectively. The on-time branch will use the delayed orthogonal code/PN product to demodulate the on-time signal at stage 510-O. Similarly, the delayed branch recovers the delayed data at stage 510-D. The pilot branch is used to determine, among other things, the path delay and channel gain and to correct for phase variations in the on-time and delayed paths at stages 535-O and 535-D respectively. If the PN offset or the frame number indicates that the signal is from the distant satellite, (relative depending on the location in the United States, for example), then the signal at the output of both the on-time and delayed branches must be buffered using buffers 540-O or 540-D so that the signals at this point can be lineed up with the reception of the signal from the other satellite.

The on-time branch of the j-th finger is then summed with the output of the other fingers at stage 550, and then delayed using a 4-second buffer 560. The output of the delayed and on-time fingers are then combined at stage 570 and fed to the de-interleaver 465.

It is noted that by using the pilot signal, a pilot-aided coherent demodulation technique is achieved that leads to maximal-ratio-like diversity combining of the on-time and delayed signals and also the two satellite transmissions. For a more detailed discussion of maximal-ratio diversity combining, see, for example, John G. Proakis, Digital Communications, 721–25 (2d ed, McGraw Hill, 1989). Thus, when there is only one path from each satellite, fourth ($4^{th}$) order diversity is achieved.

In a further embodiment, the mobile receiver 150 can employ dual receive antennas for the spatial filtering of the two satellite signals. This technology is referred to as "beam forming," and is described in R. T. Compton, Jr., Adaptive Antennas: Concepts and Performance (Prentice Hall, 1988). It is a well known result that two antenna elements can null one interfering source. In the present invention, when the signal received from one satellite is very good, the other satellite may appear as interference and the interference loss may exceed the diversity gain. In such case, the antenna pattern can be adaptively changed to pick up only one satellite signal and null out the other satellite signal.

In addition, rather than assigning equal power to all channels at all times, as described above, if some of the audio channels contain speech, such as talk radio, then the power can be adaptively allocated to those channels so that the capacity of the CDM system 100 can be maximized. During the periods when there is silence, the bit-rate of the source is low and the energy that is assigned to the talk channel can be lowered as well.

It is to be understood that the embodiments and variations shown and described herein are merely illustrative of the principles of this invention and that various modifications may be implemented by those skilled in the art without departing from the scope and spirit of the invention.

We claim:

1. A method for broadcasting a programming signal in a satellite broadcast system, comprising the steps of:

broadcasting an on-time version of said programming signal on a carrier frequency using a first orthogonal code from a first geo-synchronous satellite; and broadcasting a delayed version of said signal on said carrier frequency using a second orthogonal code from said first geo-synchronous satellite, insert such that a receiver can recover said programming signal from at least one of said one-time and delayed versions of said programming signal.

2. The method according to claim 1, further comprising the step of broadcasting said on-time and delayed versions of said signal from a second geo-synchronous satellite.

3. The method according to claim 2, wherein said signals broadcast by said first and second satellites are encoded using the same pseudo-noise sequence or a linear translation of the same pseudo-noise sequence.

4. The method according to claim 1, further comprising the step of broadcasting said on-time and delayed versions of said signal from a terrestrial repeater.

5. The method according to claim 4, wherein said terrestrial repeater broadcasts the transmission of only said first geo-synchronous satellite.

6. The method according to claim 1, further comprising the step of multiplexing a plurality of said programming signals onto a carrier frequency using Code division multiple access technology.

7. The method according to claim 1, wherein said programming signal is encoded using a perceptual audio coder.

8. A method for receiving a programming signal in a satellite broadcast system that transmits on-time and delayed versions of said programming signal, comprising the steps of:
   demodulating said on-time version of said programming signal using a product of a first orthogonal code and a pseudo-noise sequence;
   demodulating said delayed version of said programming signal using a product of a second orthogonal code and the same pseudo-noise sequence or a linear translation of the same pseudo-noise sequence as said on-time version; and
   recovering said programming signal from at least one of said demodulated on-time and delayed versions of said programming signal.

9. The method according to claim 8, further comprising the steps of delaying said demodulated on-time version of said programming signal and combining said demodulated on-time and delayed versions of said programming signal to recover said programming signal.

10. The method according to claim 9, wherein said demodulated on-time and delayed versions of said programming signal to recover said programming signal are combined using a maximal ratio combining technique.

11. The method according to claim 8, further comprising the step of coherently combining each of said demodulated on-time and delayed versions of said programming signal with other delayed finger outputs to compensate for multipath propagation.

12. The method according to claim 8, further comprising the steps of detecting a pilot signal and using said pilot signal to compensate for path delay.

13. The method according to claim 8, further comprising the steps of detecting a pilot signal and using said pilot signal to compensate for channel gain.

14. The method according to claim 8, wherein said on-time and delayed versions of said programming signal are received from two geo-synchronous satellites.

15. The method according to claim 8, wherein said on-time and delayed versions of said programming signal are received from at least one geo-synchronous satellite that transmits both said on-time and delayed versions of said programming signal.

16. A satellite broadcast system, comprising:
   at least one geo-synchronous satellite for broadcasting an on-time version of a programming signal on a carrier frequency using a first orthogonal code and a delayed version of said signal on said carrier frequency using a second orthogonal code; and
   a receiver for recovering said programming signal from at least one of said on-time and delayed versions of said programming signal.

17. The satellite broadcast system according to claim 16, further comprising a second geo-synchronous satellite for broadcasting said on-time and delayed versions of said signal.

18. The satellite broadcast system according to claim 17, wherein said signals broadcast by said first and second satellites are encoded using the same pseudo-noise sequence or a linear translation of the same pseudo-noise sequence.

19. The satellite broadcast system according to claim 16, further comprising a terrestrial repeater for broadcasting said on-time and delayed versions of said signal.

20. The satellite broadcast system according to claim 19, wherein said terrestrial repeater broadcasts the transmission of only said first geo-synchronous satellite.

21. The satellite broadcast system according to claim 16, wherein said at least one geo-synchronous satellite multiplexes a plurality of said programming signals onto a carrier frequency using Code division multiple access technology.

22. The satellite broadcast system according to claim 16, further comprising a perceptual audio coder for encoding said programming signal.

23. A receiver in a satellite broadcast system, comprising:
   means for demodulating an on-time version of a programming signal using a product of a first orthogonal code and a pseudo-noise sequence;
   means for demodulating a delayed version of said programming signal using a product of a second orthogonal code and the same pseudo-noise sequence or a linear translation of the same pseudo-noise sequence as said on-time version; and
   means for recovering said programming signal from at least one of said demodulated on-time and delayed versions of said programming signal.

24. The receiver according to claim 23, further comprising a buffer for delaying said demodulated on-time version of said programming signal and a summer for combining said demodulated on-time and delayed versions of said programming signal to recover said programming signal.

25. The receiver according to claim 24, wherein said demodulated one-time and delayed versions of said programming signal to recover said programming signal are combined using a maximal ratio combining technique.

26. The receiver according to claim 23, further comprising means for coherently combining each of said demodulated on-time and delayed versions of said programming signal with other delayed finger outputs to compensate for multipath propagation.

27. The receiver according to claim 23, further comprising means for detecting a pilot signal and using said pilot signal to compensate for path delay.

28. The receiver according to claim 23, further comprising means for detecting a pilot signal and using said pilot signal to compensate for channel gain.

29. The receiver according to claim 23, wherein said on-time and delayed versions of said programming signal are received from two geo-synchronous satellites.

30. The receiver according to claim 23, wherein said on-time and delayed versions of said programming signal are received from at least one geo-synchronous satellite that transmits both said on-time and delayed versions of said programming signal.

* * * * *

UNITED STATES PATENT AND TRADEMARK OFFICE
CERTIFICATE OF CORRECTION

PATENT NO. : 6,728,202 B1 Page 1 of 1
DATED : April 27, 2004
INVENTOR(S) : Sayeed et al.

It is certified that error appears in the above-identified patent and that said Letters Patent is hereby corrected as shown below:

Column 7,
Line 3, after "satellite," and before "such" delete -- insert --.
Line 5, after "said" and before "and" replace "one-time" with -- on-time --.

Column 8,
Line 56, after "demodulated" and before "and" replace "one-time" with -- on-time --.

Signed and Sealed this

Twentieth Day of September, 2005

JON W. DUDAS
*Director of the United States Patent and Trademark Office*